United States Patent [19]

Alexander et al.

[11] 4,036,459

[45] July 19, 1977

[54] INSTRUMENT SWIVEL BRACKET

[75] Inventors: Merwin K. Alexander, Clayton; Daniel J. Meyer, Ballwin; Philip Cohen, Clayton, all of Mo.

[73] Assignee: Optical Associates, Inc., St. Louis, Mo.

[21] Appl. No.: 661,977

[22] Filed: Feb. 27, 1976

[51] Int. Cl.² .............................................. F16M 1/00
[52] U.S. Cl. ........................................ 248/11; 248/16; 248/288 B
[58] Field of Search ................ 248/11, 288 R, 288 B, 248/289, 516; 403/114, 143

[56] References Cited

U.S. PATENT DOCUMENTS

| 352,025 | 11/1886 | Zanetti | 403/143 |
|---|---|---|---|
| 596,207 | 12/1897 | Hart | 248/516 X |
| 782,424 | 2/1905 | Smith | 403/143 |
| 787,486 | 4/1905 | Whipple | 248/516 |
| 1,432,964 | 10/1922 | Busher | 248/51 |
| 2,122,988 | 7/1938 | Nelson | 248/51 X |
| 3,059,948 | 10/1962 | Thompson et al. | 248/288 B X |
| 3,358,957 | 12/1967 | Lindenmuth | 248/279 |
| 3,944,178 | 3/1976 | Greenwood | 248/288 R |

Primary Examiner—William H. Schultz
Attorney, Agent, or Firm—Paul M. Denk

[57] ABSTRACT

In a bracket for an instrument, a swiveled yoke connects in a ball joint like coupling relationship to an extension that fastens to a support, and is useful for supporting an instrument in the category of a projector, or the like. The swivel socket provided to one end of the extension is separable, with a semicircular shoulder comprising part of an annulus provided in the upper portion of each socket half, and the socket having an extension spaced therebelow, and useful for securing the ball of the yoke therein for universal movement when the socket is assembled.

6 Claims, 7 Drawing Figures

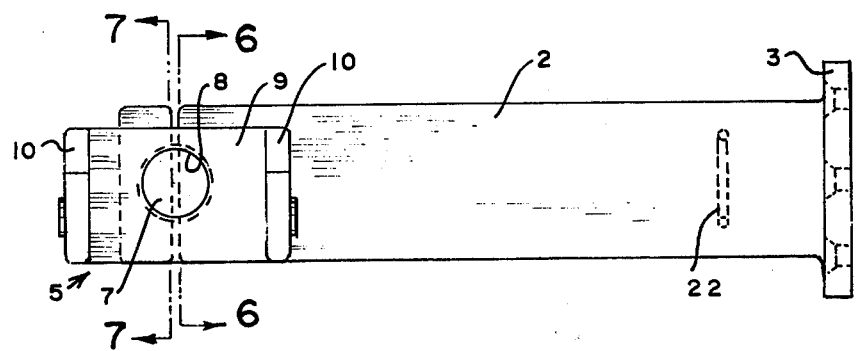
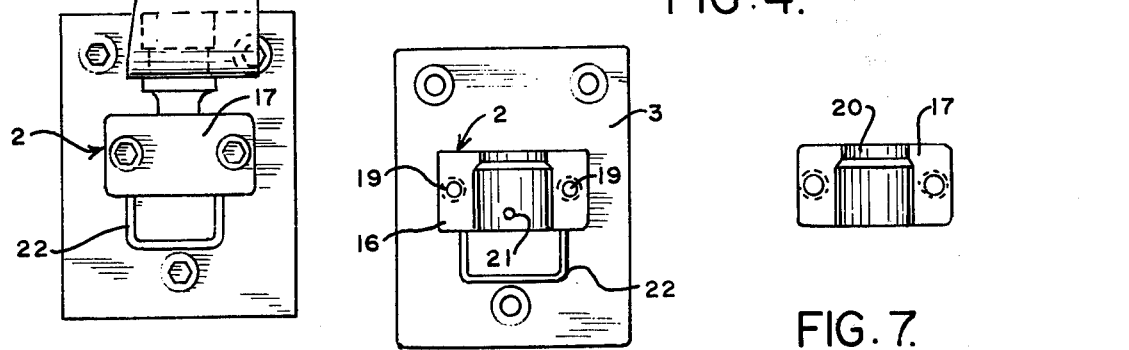
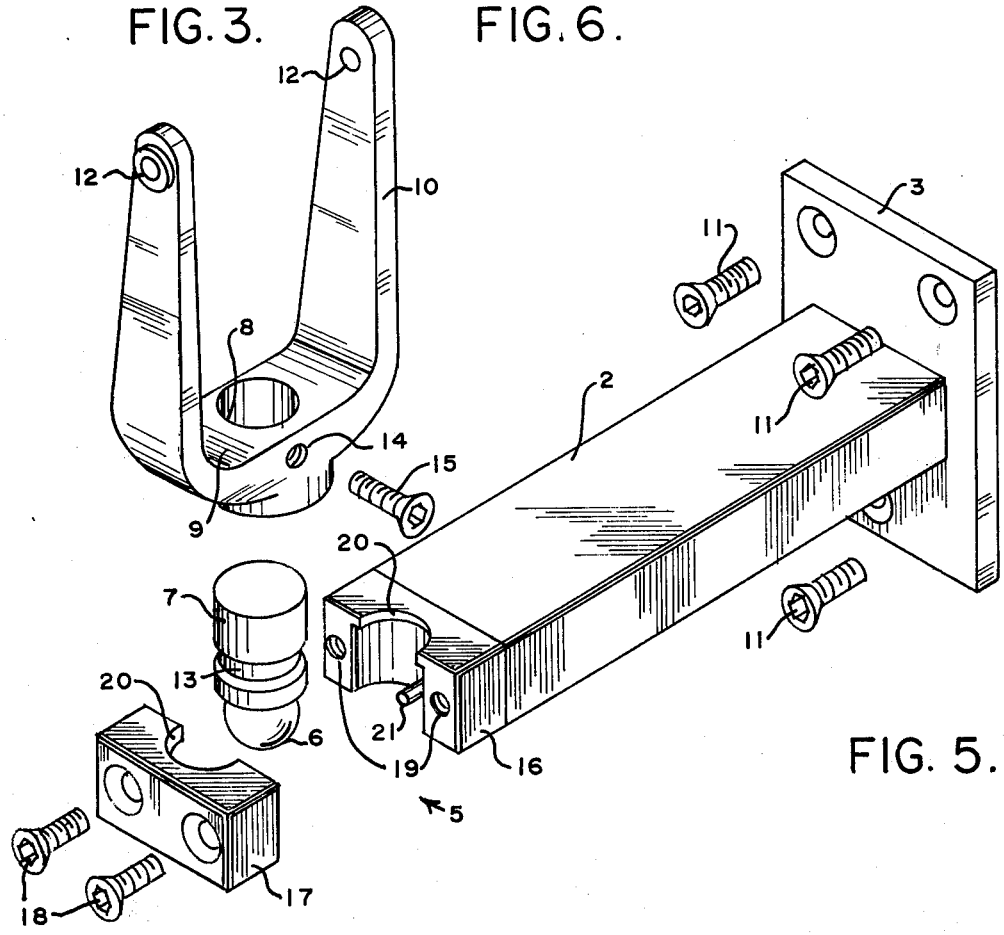

INSTRUMENT SWIVEL BRACKET

BACKGROUND OF THE INVENTION

This invention relates generally to a bracket, but more particularly pertains to a universal form of swivel bracket that is designed to allow for the fine setting of a projector or other instrument as particularly utilized in the ophthalmic arts.

A variety of wall brackets, or other forms of brackets, are available in the prior art, but mainly such brackets are designed for fixing an item to a particular bracket and for its stationary disposition. Where such brackets have been designed to allow freer movement to the items supported, generally means are only provided for allowing pivotal movement to the bracket, or perhaps even in some instances, some swiveling action, but the two would not appear to have been combined so as to allow for more universal movement to an instrument so as to allow for its fine and precise setting as required. For example, in the field of ophthalmology, frequently various types of projectors, that may be used for projecting charts or other information to a distant screen, are frequently employed and used during eye inspection and testing. The setting of such projectors must be done in a manner that disposes the projected chart with some preciseness, otherwise the physician or oculist cannot be certain that his inspection or testing of the patient's sight is being performed with the high degree of accuracy required. Hence, frequently the projector must be slightly pivoted and/or canted in its disposition, so that the most finely tuned picture is being projected to the remote screen. In view of this, the present invention is designed to allow for this acquisition and maintaining of such accuracy in the bracketing of medical instruments, so that the medical readings taken will assure the examiner that his diagnosis is sound.

It is, therefore, the principal object of this invention to provide a bracket that may be stably mounted to a support and, as required, swivelly dispose a projector or other instrument thereupon.

Another object of this invention is to provide an instrument bracket that incorporates a plurality of pivotal and swivel movements so that the instrument may be precisely located and positioned as required, and then its bracket tightened to insure its lasting positioning as arranged.

A further object of this invention is to provide a swivel bracket that incorporates a separable socket which may be loosened to provide adjustment to its yoke, or tightened to fix the same in place.

An additional object of this invention is to provide a swivel bracket incorporating an electric wire holder that insures the proximity of an outlet for operation of the mounted instrument.

Another object is to provide an instrument bracket that incorporates means for insuring its positive rigidity when secured upon a supporting surface.

A further object of this invention is to provide a projector bracket that may be adjusted to insure perfect setting of the projector even though the supporting surface or wall may not have perfect alignment.

A further object is to provide a bracket that allows for precise setting to a projector to overcome image distortion in the event that the wall support is unaligned.

These and other objects may become more apparent to those skilled in the art upon reviewing the following summary, in addition to undertaking a study of the description of the preferred embodiment in view of its drawings.

SUMMARY OF THE INVENTION

This invention contemplates a swivel type bracket that may be mounted to any supporting surface, including a wall, cabinet, or the like, and thereby eliminate the need for a table base, as normally needed and used, as for example, in the support of a projector as utilized in ophthalmic examinations. The bracket is mainly designed incorporating an extension that secures to a proximate wall, but with the extension having sufficient length to dispose a yoke some distance and with clearance away from said wall so as to provide sufficient spacing for vertical arrangement and alignment of the projector during usage. The yoke includes a base portion that is separable, providing a separable swivel type ball socket, and in which the ball of the yoke is disposed during assembly. The separable socket is generally held together by a series of fastening means, such as screws, and is designed having that tolerance so that when the fastening means are tightened in place, the swivel ball, and its yoke, will become stationary. On the other hand, it is just as likely that slight clearance may be provided between the swivel ball and its socket so that forced repositioning of the yoke, and any supported instrument, may be quickly made as during its usage.

The swivel ball of the bracket incorporates an integral shaft that extends from the same, and the shaft is designed having an annular groove provided around its periphery, and which is designed for cooperating with a fastening key or pin connecting through the base portion of the yoke so as to allow for the said yoke to be pivotally turned upon said swivel shaft, or tightened in place. Regarding the latter, when the projector or other instrument supported by the yoke has been set to a particular position, as required, the key may be fastened in place so as to tighten and lock the yoke with respect to the swivel ball shaft, and likewise, the swivel socket itself may be tightened so as to totally secure the bracket from movement.

A wire holder is provided upon the bracket extension portion, preferably upon its underside, and supports an electric wire that furnishes the electrical outlet and incident charge necessary for operation of the instrument mounted by the bracket.

BRIEF DESCRIPTION OF THE DRAWINGS

In the drawings, FIG. 1 discloses, in perspective, the instrument swivel bracket of this invention, and also shows, in hidden line, a projector mounted thereto;

FIG. 3 provides an end view of the instrument swivel bracket disclosed in FIG. 2;

FIG. 4 provides a plan view of the bracket disclosed in FIG. 2;

FIG. 5 discloses an exploded view of the instrument swivel bracket as disclosed in FIG. 1;

FIG. 6 provides an end view of one of the swivel ball socket halves taken along the line 6—6 of FIG. 4; and FIG. 7 provides an end view of the other swivel ball socket halve as taken along the line 7—7 of FIG. 4.

DESCRIPTION OF THE PREFERRED EMBODIMENT

Figure 1:
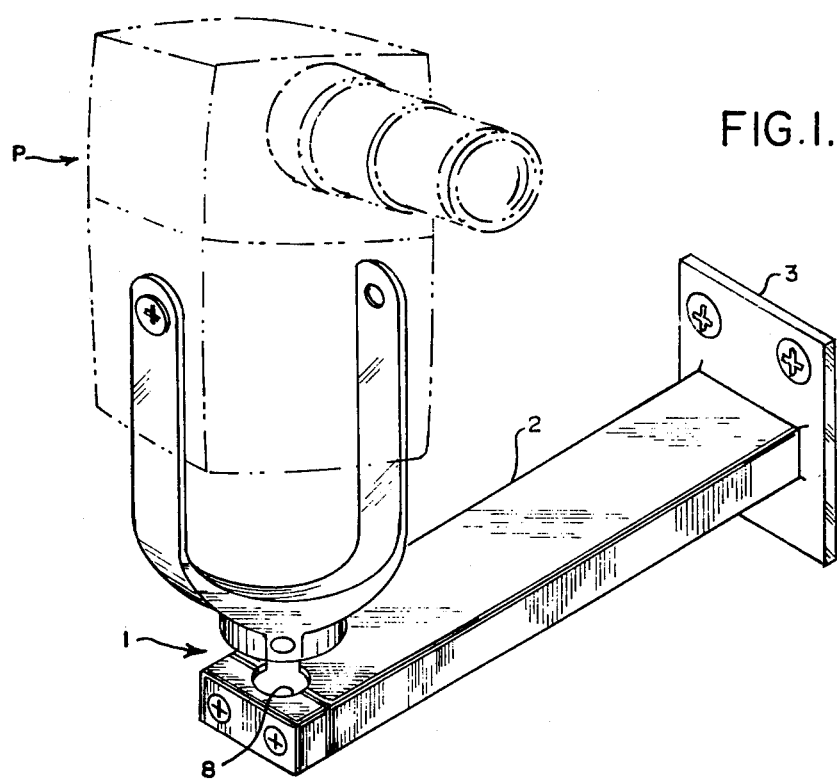
Figure 2:
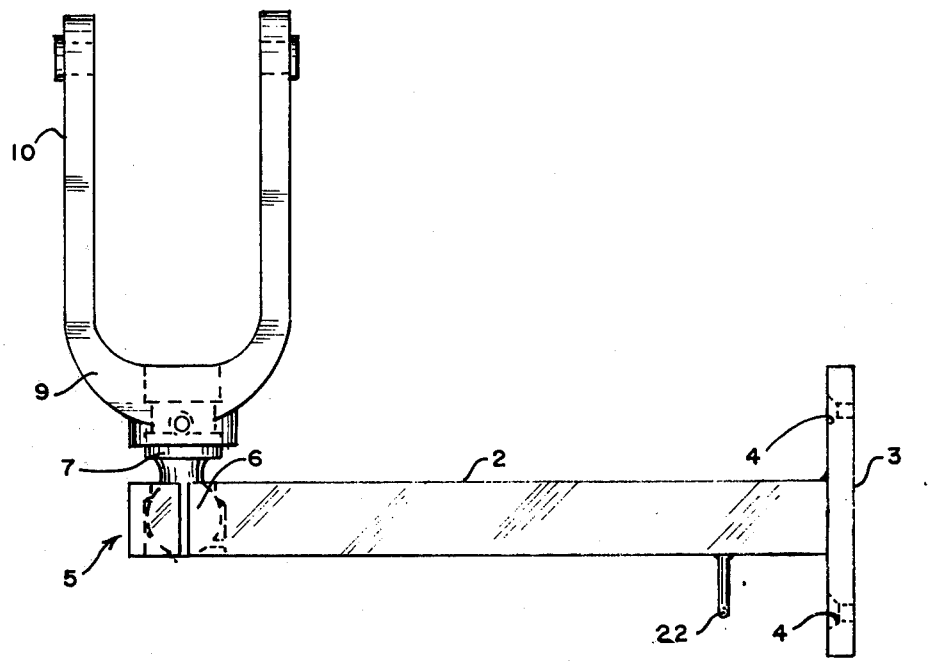
FIG. 2 provides a side view of the instrument swivel bracket disclosed in FIG. 1.

In referring to the drawings, and in particular FIG. 1, there is disclosed the instrument swivel bracket 1 of this invention, and which is shown, in hidden line, mounting a projector P, or other instrument, such as may frequently be utilized by medical technicians, such as in the ophthalmic arts. By referring also to FIGS. 2 through 4, the bracket of this invention incorporates an extension 2 which may be formed of any type of metal stock, even tubular in configuration, and is designed having sufficient length so as to displace the held projector a significant distance away from the wall to which the bracket mounts, so that the projector can be maintained, pivoted, and even slightly swiveled in place, to allow for its precise adjustment before usage. One end of the extension 2 incorporates a support 3, which as shown, may comprise a rectangular plate, that is welded or otherwise secured to the proximate end of the extension, and incorporates a series of apertures, as at 4, therethrough to accommodate fastening means, such as screws, for securing the bracket to a wall or the like. The opposite end of the extension 2 includes a socket like arrangement 5, whic is designed for holding a swivel ball 6 that is integrally formed having a shaft portion 7 extending upwardly therefrom, which shaft cooperates within an aperture, as at 8, of the base portion 9 so as to mount a yoke 10 in place.

As can be more accurately seen in FIG. 5, which is an exploded view of the entire bracket, the extension 2 and its secured support or plate 3 may be seccured into position, as against a wall, by means of the screws 11. The yoke 10, which as can be see, comprises a bifuracated member which includes a pair of apertures, as at 12, proximate its upward ends, and to which the projector P may be pivotally mounted. The base portion 9 of the yoke includes the aperture 8, being vertically disposed, and the shaft portion 7 extending from the swivel ball 6 is designed for inserting and being retained within this aperture 8 so as to allow for a retention of the swivel ball with respect to its yoke 10. The shaft 7 includes an annular groove 13 around its periphery, and this groove is designed for aligning with a threaded aperture 14 provided through the base of the said yoke. A threaded key, as at 15, is designed for securement through the threaded aperture 14, and for disposition in either a keying or locking position within the groove 13 of the shaft 7, so as to secure the swivel ball dependingly from the bottom of the base portion 9 of the yoke 10. When the key 15 is inserted some distance into the annualar groove 13, the yoke may yet pivot with respect to its swivel, and, when the key 15 is fully inserted so as to bind against the surface of the said annular groove, the swivel ball will then become locked into position with respect to its yoke 10, Thus, depending upon the degree of tightening of the key 15 within the yoke, pivotal movement or securement can be acquired for the yoke.

As previously explained, a swivel ball socket 5 is provided at the opposite end of the extension 2. This socket comprises two socket halves 16 and 17, with socket half 16 being secured, as by welding or soldering to the extension end. The other socket half 17 is designed for separating from the socket 16, as by loosening and removal of the threaded numbers 18 from their connection within the threaded apertures 19 provided in the socket 16. Preferably, the socket spacings provided within each socket half for accommodating the swivel ball 6 will be formed dimensions so that when the threaded members 18 are totally secured within the apertures 19, the two socket halves 16 and 17 will firmly and tightly grasp the swivel ball 6 amd secure the yoke firmly in place. This is so because once the projector P, or other instrument, is precisely adjusted, it is then desirable to tightly secure the bracket into its set position so as to insure permanent accuracy during usage. But, when the threaded members 18 are slightly loosened, then this normally provides sufficient play between the swivel ball 6 and its socket, thereby allowing swivel movement to be achieved of the yoke. In addition, it is possible that the socket 5 may be designed for snugly embracing, but not binding, the swivel ball 6, even when its fastening members 18 are totally secured so that some swivel action, albeit forcefully accomplished, may yet achieved even after the socket halves 16 and 17 have become firmly tightened in place.

To insure the proper positioning of the swivel ball 6 within the socket 5, the upper portion of each socket half 16 and 17 is provided with a semicircular annulus, as at 20, so as to properly seat the swivel ball from above, and likewise, a projection 21 is provided extending from one socket half, proximate its lower portion, for the purpose of locating said swivel ball from below. A slight clearance is provided between the annulus and the ball to provide for a slight swivel movement of the ball therethrough. Hence, the swivel ball 6 can be locked into position within the socket 5 by these two previously described components. Obviously, other forms of locating means could be designed into this style of socket so as to provide proper positioning of the ball therein, but the designed configurations have been found to operate satisfactorily for their intended purpose.

The extension 2 of the bracket is designed incorporating a holder 22, and which is designed for supporting the female part of an electrical receptacle of an extension cord, and into which the electrical cord of the instrument may be coupled so as to furnish it with the required electrical charge. This holder, as can be seen in FIGS. 3 and 6, comprises any form of bent wire or the like and having sufficient spacing through its interior so that an electrical cord may be inserted therethrough, rested upon the same, and thereby dispose its receptacle portion for quick plug in when the projector is to be used.

Other variations in this style of instrument swivel bracket may occur to those skilled in the art upon reviewing the aforesaid disclosure. The embodiment shown is set forth for illustrative purposes only, and any variations or modifications in this design, and encompassed within the spirit and scope of this invention as defined by its claim, are intended to be protected by any patent issuing hereon.

We claim:

1. A swivel bracket for mounting a projector or other instrument away from a supporting surface, and including an extension having the length to dispose the bracket a distance away from a surface, said extension having one end capable of fastening to a supporting surface, fastening means provided for mounting the extension and its held bracket to a supporting surface, said bracket including a swivel yoke for mounting of an instrument, said yoke incorporating a ball proximate its bottom end, said extension having means provided proximate one end to acccommodate the said ball for swivel movement, said means comprising a separable swivel socket, said swivel socket being separable into approximate halves, fastening means securing said halves together, an integral annulus provided proximate the upper portion of said socket for seating said ball from above, approximately one half of said annulus being formed on each of said half sockets, a projection extending from the lower portion of said socket, for locating said ball from below, and said projection extending from one of said half sockets.

2. The invention of claim 1 wherein one of said socket halves is welded to the proximate extension end disposed opposite from that end of the extension capable of mounting to the supporting surface.

3. The inventiOn of claim 1 and including an electrical wire holder secured to said extension and useful for supporting an electrical wire proximate a mounted instrument.

4. The invention of claim 1 wherein said swivel ball includes a projecting shaft, said shaft having an annular groove formed around the same, the yoke having a base portion, there being an aperture provided in said base portion, said shaft extending into said base aperture, keying means provided on said base and extending into the shaft groove for disposing said yoke for pivotal movememt.

5. The invention of claim 4 wherein the tightening of said key menas within said shaft groove fixes the swivel ball to the yoke.

6. A swivel bracket for mounting a projector for use during ophthalmic examination away from a supporting surface, and including an extension having a length to dispose the bracket a distance away from a surface, said extension having one end capable of fastening to a supporting surface, fastening means provided for mounting the extension and its held bracket to a supporting surface, said bracket including a swivel yoke for mounting a projector, said yoke incorporating a ball proximate its bottom end, said extension having means provided proximate one end to accommodate the said ball in both pivotal and slight swivel movement, said means comprising a separable swivel socket, an integral annulus provided proximate the upper portion of said socket for seating said ball from above, said annulus having sufficient clearance from the ball to provide for its slight swivel movement therethrough, and a projection extending from the lower portion of said socket for locating said ball from below.

* * * * *